US008649910B2

(12) United States Patent
Nickerson et al.

(10) Patent No.: US 8,649,910 B2
(45) Date of Patent: *Feb. 11, 2014

(54) AUTOMATICALLY ADJUSTING IRRIGATION CONTROLLER

(75) Inventors: Harvey J. Nickerson, San Diego, CA (US); John R. German, Ramona, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,929

(22) Filed: Jun. 12, 2012

(65) Prior Publication Data
US 2012/0259473 A1    Oct. 11, 2012

Related U.S. Application Data

(63) Continuation of application No. 12/332,274, filed on Dec. 10, 2008, now Pat. No. 8,200,368.

(51) Int. Cl.
*G05D 11/00* (2006.01)
*F21S 8/00* (2006.01)
*B05B 3/00* (2006.01)
*B05B 3/18* (2006.01)
*E02B 11/00* (2006.01)
*E02B 13/00* (2006.01)

(52) U.S. Cl.
USPC ............. 700/284; 700/282; 700/283; 239/19; 239/723; 137/78.1; 137/78.2; 137/78.3; 405/36

(58) Field of Classification Search
USPC ............ 700/282–284; 239/19, 723; 137/78.1, 137/78.2, 78.3; 405/36
See application file for complete search history.

(56) References Cited

U.S. PATENT DOCUMENTS

| 4,015,366 A | 4/1977 | Hall, III |
| 4,569,020 A | 2/1986 | Snoddy et al. |
| 4,856,227 A | 8/1989 | Oglevee et al. |

(Continued)

FOREIGN PATENT DOCUMENTS

| GB | 2097555 | 11/1982 |
| JP | 08-275684 A | 10/1996 |

(Continued)

OTHER PUBLICATIONS

"On-Line Evapotranspiration;" Published Prior to May 17, 2007; p. 5.

(Continued)

*Primary Examiner* — Ramesh Patel
(74) *Attorney, Agent, or Firm* — Fitch, Even, Tabin, & Flannery, LLP

(57) ABSTRACT

Methods and devices are provided to automatically determine plant water requirements and adjust irrigation in order to make efficient use of water. In one implementation an irrigation control unit comprises at least one input configured to be coupled to and receive signals from a temperature sensor, the signals corresponding to current values of temperature. The unit also includes a memory storing historical values of a plurality of variables and a processor coupled to the at least one input and the memory. The processor is configured to determine plant water requirements at least in part using the historical values of the plurality of variables and the current values of the temperature.

36 Claims, 4 Drawing Sheets

(56) References Cited

U.S. PATENT DOCUMENTS

| | | | |
|---|---|---|---|
| 4,858,377 A | 8/1989 | Oglevee et al. | |
| 4,876,647 A | 10/1989 | Gardner et al. | |
| 4,922,433 A | 5/1990 | Mark | |
| 4,962,522 A | 10/1990 | Marian | |
| 5,021,939 A | 6/1991 | Pulgiese | |
| 5,023,787 A | 6/1991 | Evelyn-Veere | |
| 5,025,361 A | 6/1991 | Pitman et al. | |
| 5,038,268 A | 8/1991 | Krause et al. | |
| 5,097,861 A | 3/1992 | Hopkins et al. | |
| 5,208,855 A * | 5/1993 | Marian | 239/69 |
| 5,229,937 A | 7/1993 | Evelyn-Veere | |
| 5,251,153 A * | 10/1993 | Nielsen et al. | 700/284 |
| 5,361,534 A * | 11/1994 | Burns et al. | 47/79 |
| 5,400,815 A * | 3/1995 | Whitehill | 137/78.2 |
| 5,421,515 A * | 6/1995 | Rinkewich | 239/68 |
| 5,444,611 A | 8/1995 | Woytowitz et al. | |
| 5,479,339 A * | 12/1995 | Miller | 700/16 |
| 5,496,112 A * | 3/1996 | Browne | 374/54 |
| 5,497,339 A | 3/1996 | Bernard | |
| 5,668,719 A * | 9/1997 | Bobrov et al. | 702/2 |
| 5,696,671 A * | 12/1997 | Oliver | 700/284 |
| 5,740,038 A | 4/1998 | Hergert | |
| 5,839,658 A | 11/1998 | Sarver | |
| 5,870,302 A * | 2/1999 | Oliver | 700/11 |
| 6,088,621 A | 7/2000 | Woytowitz et al. | |
| 6,102,061 A | 8/2000 | Addink | |
| 6,108,590 A | 8/2000 | Hergert | |
| 6,145,755 A | 11/2000 | Feltz | |
| 6,227,220 B1 | 5/2001 | Addink | |
| 6,276,298 B1 | 8/2001 | Welsh | |
| 6,298,285 B1 * | 10/2001 | Addink et al. | 700/284 |
| 6,314,340 B1 | 11/2001 | Mecham et al. | |
| 6,343,255 B1 | 1/2002 | Peek et al. | |
| 6,453,215 B1 | 9/2002 | Lavoie | |
| 6,453,216 B1 | 9/2002 | McCabe | |
| 6,585,168 B1 * | 7/2003 | Caprio | 236/44 A |
| 6,675,098 B2 | 1/2004 | Peek et al. | |
| 6,748,327 B1 | 6/2004 | Watson | |
| 6,782,310 B2 | 8/2004 | Bailey et al. | |
| 6,782,311 B2 | 8/2004 | Barlow et al. | |
| 6,823,239 B2 | 11/2004 | Sieminski | |
| 6,850,819 B1 | 2/2005 | Townsend | |
| 6,892,113 B1 | 5/2005 | Addink et al. | |
| 6,892,114 B1 | 5/2005 | Addink et al. | |
| 6,895,987 B2 | 5/2005 | Addink et al. | |
| 6,898,467 B1 | 5/2005 | Smith | |
| 6,947,811 B2 | 9/2005 | Addink et al. | |
| 7,010,394 B1 | 3/2006 | Runge et al. | |
| 7,048,204 B1 | 5/2006 | Addink | |
| 7,058,478 B2 | 6/2006 | Alexanian | |
| 7,096,094 B2 | 8/2006 | Addink et al. | |
| 7,133,749 B2 | 11/2006 | Goldberg et al. | |
| 7,165,730 B2 | 1/2007 | Clark et al. | |
| 7,203,576 B1 | 4/2007 | Wilson et al. | |
| 7,266,428 B2 | 9/2007 | Alexanian | |
| 7,363,113 B2 | 4/2008 | Runge et al. | |
| 7,398,139 B1 | 7/2008 | Woytowitz | |
| 7,400,944 B2 | 7/2008 | Bailey et al. | |
| 7,403,840 B2 | 7/2008 | Moore et al. | |
| 7,406,363 B2 | 7/2008 | Doering et al. | |
| 7,412,303 B1 | 8/2008 | Porter et al. | |
| 7,421,317 B2 | 9/2008 | Christiansen | |
| 7,430,458 B2 | 9/2008 | Dansereau et al. | |
| 7,444,207 B2 | 10/2008 | Nickerson et al. | |
| 7,469,707 B2 | 12/2008 | Anderson et al. | |
| 7,574,284 B2 | 8/2009 | Goldberg et al. | |
| 7,805,221 B2 | 9/2010 | Nickerson | |
| 7,809,475 B2 | 10/2010 | Kaprielian | |
| 7,844,368 B2 | 11/2010 | Alexanian | |
| 7,853,363 B1 | 12/2010 | Porter et al. | |
| 7,877,168 B1 | 1/2011 | Porter et al. | |
| 8,170,721 B2 | 5/2012 | Nickerson | |
| 8,200,368 B2 | 6/2012 | Nickerson | |
| 8,275,309 B2 | 9/2012 | Woytowitz | |
| 8,301,309 B1 | 10/2012 | Woytoxitz | |
| 2001/0049563 A1 | 12/2001 | Addink et al. | |
| 2002/0002425 A1 | 1/2002 | Dossey et al. | |
| 2002/0010516 A1 | 1/2002 | Addink et al. | |
| 2002/0014539 A1 | 2/2002 | Pagano et al. | |
| 2002/0020441 A1 | 2/2002 | Addink | |
| 2002/0029111 A1 | 3/2002 | Peek et al. | |
| 2002/0072829 A1 | 6/2002 | Addink et al. | |
| 2002/0166898 A1 | 11/2002 | Buhler et al. | |
| 2002/0183935 A1 | 12/2002 | Skinner | |
| 2003/0070806 A1 | 4/2003 | Connell | |
| 2003/0093159 A1 | 5/2003 | Sieminski | |
| 2003/0109964 A1 | 6/2003 | Addink et al. | |
| 2003/0179102 A1 | 9/2003 | Barnes | |
| 2003/0182022 A1 | 9/2003 | Addink et al. | |
| 2003/0183018 A1 | 10/2003 | Addink et al. | |
| 2003/0208306 A1 | 11/2003 | Addink et al. | |
| 2004/0003045 A1 | 1/2004 | Tucker et al. | |
| 2004/0011880 A1 | 1/2004 | Addink et al. | |
| 2004/0015270 A1 | 1/2004 | Addink et al. | |
| 2004/0030456 A1 | 2/2004 | Barlow et al. | |
| 2004/0039489 A1 | 2/2004 | Moore et al. | |
| 2004/0089164 A1 | 5/2004 | Addink et al. | |
| 2004/0181315 A1 | 9/2004 | Cardinal et al. | |
| 2004/0217189 A1 | 11/2004 | Regli | |
| 2004/0225412 A1 | 11/2004 | Alexanian | |
| 2005/0038529 A1 | 2/2005 | Perez et al. | |
| 2005/0038569 A1 | 2/2005 | Howard | |
| 2005/0119797 A1 | 6/2005 | Marian | |
| 2005/0143842 A1 | 6/2005 | Marian | |
| 2005/0154498 A1 | 7/2005 | Townsend | |
| 2005/0171646 A1 | 8/2005 | Miller | |
| 2005/0187665 A1 | 8/2005 | Fu | |
| 2005/0187666 A1 | 8/2005 | Marian | |
| 2005/0211792 A1 | 9/2005 | Clark et al. | |
| 2005/0211794 A1 | 9/2005 | Clark et al. | |
| 2005/0216129 A1 | 9/2005 | Clark et al. | |
| 2005/0216130 A1 | 9/2005 | Clark et al. | |
| 2005/0279856 A1 | 12/2005 | Nalbandian et al. | |
| 2006/0116792 A1 | 6/2006 | Addink | |
| 2006/0122736 A1 | 6/2006 | Alexanian | |
| 2006/0155489 A1 | 7/2006 | Addink | |
| 2006/0157580 A1 | 7/2006 | Regli | |
| 2006/0161309 A1 | 7/2006 | Moore et al. | |
| 2006/0184285 A1 | 8/2006 | Evelyn-Veere | |
| 2007/0185621 A1 | 8/2007 | Gilmore | |
| 2007/0191991 A1 * | 8/2007 | Addink | 700/284 |
| 2007/0293990 A1 | 12/2007 | Alexanain | |
| 2008/0154437 A1 | 6/2008 | Alexanian | |
| 2008/0223950 A1 | 9/2008 | Kates | |
| 2008/0234870 A1 | 9/2008 | Chalemin et al. | |
| 2008/0249664 A1 | 10/2008 | Runge et al. | |
| 2008/0275595 A1 | 11/2008 | Bailey et al. | |
| 2008/0288116 A1 | 11/2008 | Nickerson | |
| 2008/0288117 A1 | 11/2008 | Nickerson et al. | |
| 2008/0319585 A1 | 12/2008 | Nickerson et al. | |
| 2009/0008471 A1 | 1/2009 | Wilson | |
| 2009/0150001 A1 | 6/2009 | Fekete | |
| 2009/0171045 A1 | 7/2009 | Kumamoto | |
| 2009/0216345 A1 | 8/2009 | Christfort | |
| 2009/0271043 A1 | 10/2009 | Roman | |
| 2009/0271045 A1 | 10/2009 | Savelle et al. | |
| 2009/0276102 A1 | 11/2009 | Smith et al. | |
| 2009/0326723 A1 | 12/2009 | Moore et al. | |
| 2010/0004789 A1 | 1/2010 | Savella et al. | |
| 2010/0030389 A1 | 2/2010 | Palmer et al. | |
| 2010/0082170 A1 | 4/2010 | Wilson | |
| 2010/0100247 A1 | 4/2010 | Nickerson et al. | |
| 2010/0106337 A1 | 4/2010 | Sacks | |
| 2010/0145530 A1 | 6/2010 | Nickerson | |
| 2010/0145531 A1 | 6/2010 | Nickerson et al. | |
| 2010/0169017 A1 | 7/2010 | Dufauex et al. | |
| 2010/0312404 A1 | 12/2010 | Nickerson | |
| 2011/0077785 A1 | 3/2011 | Nickerson et al. | |
| 2011/0238228 A1 | 9/2011 | Woytowitz et al. | |
| 2011/0238229 A1 | 9/2011 | Woytowitz et al. | |
| 2012/0072036 A1 | 3/2012 | Piper | |
| 2012/0072037 A1 | 3/2012 | Alexanian | |

(56) References Cited

U.S. PATENT DOCUMENTS

| | | | |
|---|---|---|---|
| 2012/0191261 A1 | 7/2012 | Nickerson |
| 2012/0221154 A1 | 8/2012 | Runge |
| 2012/0259473 A1 | 10/2012 | Nickerson |

FOREIGN PATENT DOCUMENTS

| | | |
|---|---|---|
| WO | 02/05045 | 1/2002 |
| WO | 02/27419 | 4/2002 |
| WO | 2008/144563 | 11/2008 |

OTHER PUBLICATIONS

Allen et al.; "Crop Evapotranspiration—Guidelines for Computing Crop Water Requirements;" FAO Corporate Document Repository; 1998; pp. 1-13 and cover page; Chapter 2; http://www.fao.org/docrep/X0490E/X0490e06.htm.

Allen et al.; "Crop Evapotranspiration—Guidelines for Computing Crop Water Requirements;" FAO Corporate Document Repository; 1998; pp. 60-61 and three cover pages; Chapter 3; http://www.fao.org/docrep/X0490E/X0490e06.htm.

De Bruin, H.A.R; Lablans, W.N.; Abstract of "Reference Crop Evapotranspiration Determined With a Modified Makkink Equation;" Hydrological Processes; Jun. 1998; 2 pgs.; Issue 7; vol. 12; http://adsabs.harvard.edu/abs/1998HyPr...12.1053D.

Dickstein, D.A.; "Let it Rain, High-Tech Way to Save Money Down the Drain;" The Irvine World News; Jun. 5, 1986; p. A-30; Irvine, CA.

EPO; App. No. 08 755 765.8; Extended European Search Report mailed Aug. 10, 2012.

EPO; App. No. 09178670.7; Extended European Search Report mailed Mar. 18, 2013.

Hardie Irrigation; "HR6200 Controller;" Hardie Irrigation; Commercially Available Prior to May 17, 2007; 1 page.

Hargreaves, G.H.; "Defining and Using Reference Evapotranspiration;" Journal of Irrigation and Drainage Engineering; Nov./Dec. 1994; pp. 1132-1139; vol. 120; No. 6.

Heermann, D.F., Harrington, G.J. and Stahl, K.M.; Mar. 1985; p. 209.

IPA; App. No. 2008254746; Patent Examination Report mailed Dec. 21, 2012.

Irrigation Association; "Landscape Irrigation Auditor;" Irrigation Association; Jul. 2007; pp. 39-100 and pp. 133-140; Chapters 3 and 4 and Appendix C.

IRRI-TROL Mfg., Inc.; "MC Plus Controller;" IRRI-TROL Mfg., Inc.; Commercially Available Prior to May 17, 2007; pp. 1-2; Valencia, CA.

Mowad, Michelle; "Developer Installs Satellite-Based Irrigation to Flush Out Water Savings;" San Diego Business Journal; Mar. 5, 2007; pp. 6-7.

PCT; App. No. PCT/US08/063977; International Preliminary Report on Patentability mailed Nov. 17, 2009; 4 pages.

PCT; App. No. PCT/US08/063977; International Search Report mailed Oct. 23, 2008.

PCT; App. No. PCT/US08/063977; Written Opinion mailed Oct. 23, 2008.

Rain Bird; "ESP-SMT Smart Modular Control System;" Mar. 31, 2011; pp. 1-88; Rain Bird Corporation, Tucson, AZ.

Rain Bird; "ET System Overview;" May 26, 1987; pp. 1-38; Doc. No. GT27003; Rain Bird Corporation, Glendora, CA.

Rain Bird; "MAXI FACTS;" p. 1; Rain Bird Corporation, Glendora, CA.

Rain Bird; "MAXICOM Computer Control System;" 1987; pp. 1-4; Rain Bird Corporation, Glendora, CA.

Rain Bird; "MAXICOM, Central Irrigation Management System;" Published Prior to May 17, 2007; pp. P16-P36 and cover page; Sec. 3.10 to Sec. 3.14; Rain Bird Corporation, Glendora, CA.

Rain Bird; "MAXI-ET Weather Station;" May 7, 1987; pp. 1-12; Doc. No. GT27002; Rain Bird Corporation, Glendora, CA.

USPTO; U.S. Appl. No. 11/750,257; Notice of Allowance mailed Jan. 5, 2009.

USPTO; U.S. Appl. No. 11/750,257; Notice of Allowance mailed May 14, 2010.

USPTO; U.S. Appl. No. 11/750,257; Notice of Withdrawal from Issue mailed May 18, 2009.

USPTO; U.S. Appl. No. 11/750,257; Office Action mailed Apr. 2, 2008.

USPTO; U.S. Appl. No. 11/750,257; Office Action mailed Oct. 13, 2009.

USPTO; U.S. Appl. No. 12/332,274; Issue Notification mailed May 23, 2012.

USPTO; U.S. Appl. No. 12/332,274; Notice of Allowance mailed Feb. 6, 2012.

USPTO; U.S. Appl. No. 12/332,274; Notice of Allowance mailed Sep. 23, 2011.

USPTO; U.S. Appl. No. 12/332,274; Office Action mailed Feb. 4, 2011.

USPTO; U.S. Appl. No. 12/857,485; Examiner Interview Summary mailed Aug. 30, 2011.

USPTO; U.S. Appl. No. 12/857,485; Issue Notification mailed Apr. 11, 2012.

USPTO; U.S. Appl. No. 12/857,485; Notice of Allowance mailed Jan. 3, 2012.

USPTO; U.S. Appl. No. 12/857,485; Notice of Allowance mailed Sep. 21, 2011.

USPTO; U.S. Appl. No. 12/857,485; Office Action mailed Mar. 22, 2011.

USPTO; U.S. Appl. No. 12/892,802; Office Action mailed Dec. 19, 2012.

USPTO; U.S. Appl. No. 13/438,805; Office Action mailed Jul. 6, 2012.

Weather; "Modified Penman Combination Equation;" Apr. 9, 1990; pp. 1-5.

Weathermatic; "Mark Series Controllers;" Telsco Industries; 1985; pp. 1-4; Dallas, TX.

Weathermatic; "Smartline Controller Models SL800, SL1600, SL4800 Owner's Manual;" Telsco Industries; pp. 1-33; Commercially Available Prior to May 17, 2007; Dallas, TX.

Wikipedia; "Evapotranspiration;" http://en.wikipedia.org/wiki/Evapotranspiration; May 16, 2007; pp. 1-4.

Hunter, Solar Sync and Wireless Solar Sync Brochure, Oct. 12, 2008, San Marcos, CA, published at http://web.archive.Org/web/20081012080937/http://www.hunterindustries.com.

Hunter, Solar Sync Owners Manual and Programming Instructions, Dec. 2009, San Marcos, CA, published at http://web.archive.Org/web/20120502050544/http://www.hunterindustries.com/sites/default/files/ OM_SolarSync_DOM.pdf.

Hunter, Solar Sync Owner's Manual and Programming Instructions, Oct. 12, 2008, San Marcos, CA, published at http://web.archive.Org/web/20081012080937/http://www.hunterindustries.com.

Hunter, Wireless Solar Sync Owners Manual and Programming Instructions, Sep. 2010, San Marcos, CA, published at http://web.archive.org/web/20120502052117/http://www.hunterindustries.com/sites/default/files/ OM_WirelessSS_Dom.pdf.

\* cited by examiner

AUTOMATICALLY ADJUSTING IRRIGATION CONTROLLER

This application is a continuation of U.S. application Ser. No. 12/332,274, filed Dec. 10, 2008, entitled AUTOMATICALLY ADJUSTING IRRIGATION CONTROLLER WITH TEMPERATURE AND RAINFALL SENSOR, which is incorporated in its entirety herein by reference.

BACKGROUND OF THE INVENTION

1. Field of the Invention

The present invention relates to irrigation and, in particular, to a system and method for automatically controlling irrigation.

2. Discussion of the Related Art

It is becoming increasingly important that irrigation controllers make efficient use of water. There have been several attempts to adjust the amount of water applied to landscape plant life based on weather conditions. Some attempts are based on mathematical models (known as evapotranspiration or ET) to determine plant watering requirements based on weather conditions. Most industry accepted ET models (such as the Penman-Monteith model) require weather data for temperature, solar radiation, humidity and wind speed. However, the sensors necessary to provide this weather data can be expensive, and as in the case of residential controllers, often cost prohibitive. Attempts have been made to create solutions that approximate the results of the ET models by storing historical ET values which are adjusted using currently sensed temperature. However, the results are often questionable since weather is not always repeatable from year to year and factors other than temperature affect ET. Others have tried alternatives to the accepted ET models in an attempt to approximate the accepted ET models. These approaches again have unproven and uncertain results.

SUMMARY OF THE INVENTION

Several embodiments of the present invention generally relates to an automatically adjusting controller that determines plant water requirements and adjusts irrigation in order to make efficient use of water.

One embodiment can be characterized as an irrigation control unit comprising at least one input configured to be coupled to and receive signals from a temperature sensor, the signals corresponding to a current value of temperature. The unit also includes a memory storing historical values of a plurality of variables and a processor coupled to the at least one input and the memory. The processor is configured to determine plant water requirements at least in part by determining an evapotranspiration (ET) value based at least in part on the historical values of the plurality of variables and the current value of temperature.

In another embodiment, the invention may be characterized as a method for use in irrigation control, and means for performing the method, the method comprising the steps: receiving a current value of temperature from a temperature sensor, the current value corresponding to a geographic location; receiving stored historical values of a plurality of variables from a memory, the stored historical values corresponding to the geographic region; determining an evapotranspiration (ET) value based on the historical values of the plurality of variables and the current value of temperature, and determining plant water requirements based at least in part on the ET value.

BRIEF DESCRIPTION OF THE DRAWINGS

The above and other aspects, features and advantages of the present invention will be more apparent from the following more particular description thereof, presented in conjunction with the following drawings, wherein.

Figure 1:
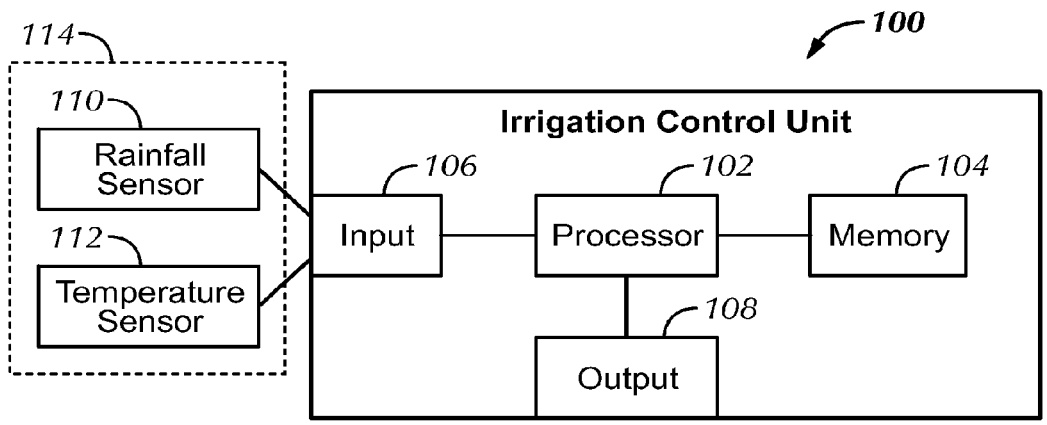
FIG. 1 is a block diagram illustrating an irrigation control unit in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the embodiments of the invention. The scope of the embodiments should be determined with reference to the claims. The present embodiments address the problems described in the background while also addressing other additional problems as will be seen from the following detailed description. It is noted that, as used in this specification and the appended claims, the singular forms "a," "an," and "the" include plural referents unless the context clearly dictates otherwise. As used herein, "comprising," "including," "containing," "characterized by," and grammatical equivalents thereof are inclusive or open-ended terms that do not exclude additional, unrecited elements or method steps.

Referring to FIG. 1, a block diagram is shown illustrating an irrigation control unit 100 in accordance with one embodiment. The irrigation control unit 100 includes a processor 102 coupled to a memory 104, at least one input 106 and an output 108. In some embodiments, the processor 102 and the memory 104 may be referred to collectively as a microcontroller. A rainfall sensor 110 and a temperature sensor 112 are coupled to the at least one input 106 in order to provide signaling that corresponds to sensed or measured values of temperature and rainfall. In some embodiments, the rainfall sensor 110 and the temperature sensor 112 are integrated into a combination rainfall and temperature sensor 114. In some embodiments, the input 106 also provides a user interface to allow a user to interact with the irrigation control unit 100, e.g., to program, configure or adjust setup parameters, program schedules, etc. In some embodiments, the input 106 also functions as a power connection that provides operational power to one or both of the sensors 110 and 112. Furthermore, in some embodiments, the input 106 may also function as an output allowing for bi-directional communication between the processor 102 and the sensors 110 and 112. The output 108 may be any output to cause or interrupt irrigation or may be a control output to provide messages to cause or interrupt irrigation. It is noted that in accordance with preferred embodiments, the rainfall sensor 110 is a sensor that provides a measurement of the amount of rainfall, as opposed to a rain cutoff switch sensor which detects when rainfall exceeds a predefined level to activate a switch to interrupt irrigation. The rainfall sensor 110 of many embodiments may also be referred to as rain gauge or rainfall accumulation sensor.

Figure 2:
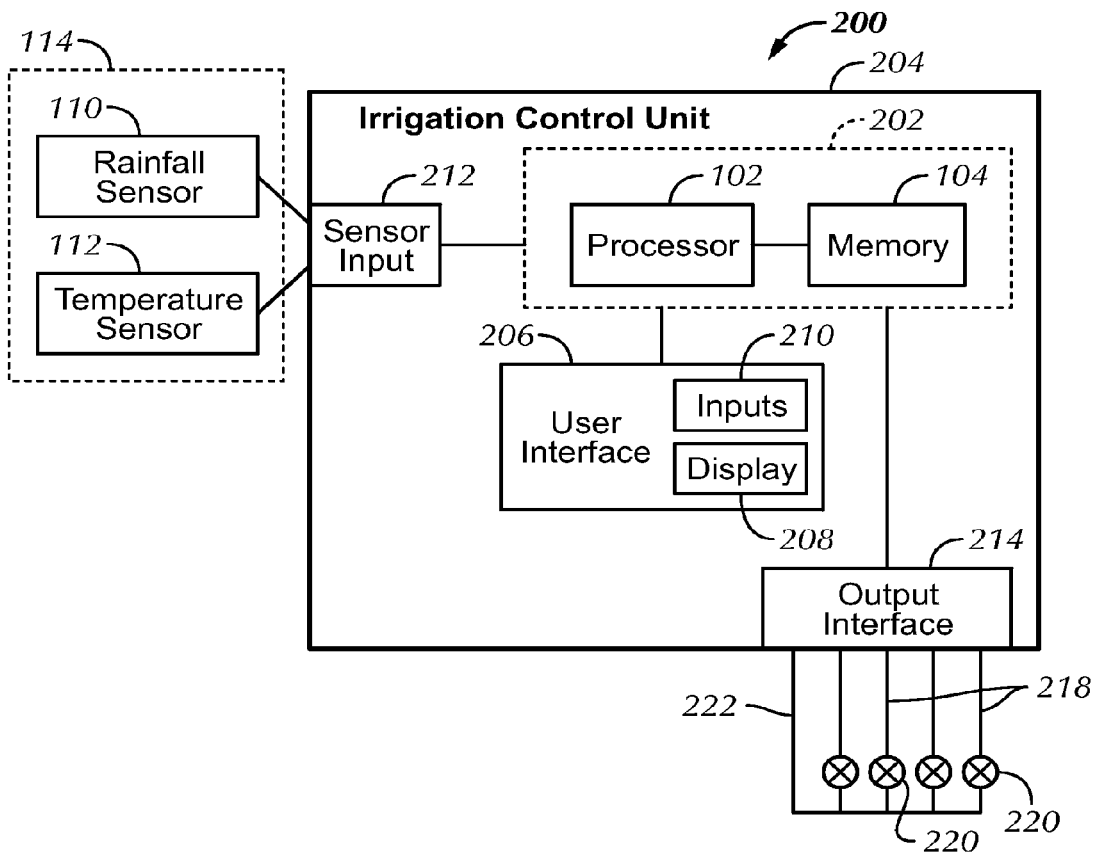
FIG. 2 is a block diagram of one embodiment of the irrigation control unit of FIG. 1.

According to several embodiments, the irrigation control unit 100 comprises a programmable irrigation controller that controls water flow to one or more irrigation stations, where each irrigation station comprises a water flow control device such as a valve or pump (for example, see FIG. 2). In other embodiments, the irrigation control unit 100 is a control device that is coupled to a programmable irrigation controller (for example, see FIG. 3). In many embodiments, the irrigation control unit 100 is adapted to automatically receive sensed temperature and rainfall data, automatically determine if irrigation should occur and if so, automatically generate and/or adjust or interrupt watering schedules on a periodic basis.

According to several embodiments, the irrigation control unit 100 is adapted to make efficient use of water by determining or calculating plant water requirements on a periodic basis for plant life to be irrigated. In some embodiments, the memory 104 stores historical values of one or more of the variables needed to calculate the plant water requirements. In several embodiments, for example, the memory 104 stores historical values for the environmental variables of solar radiation, wind speed, and humidity. In some embodiments, rather than storing historical values of the environmental variable of solar radiation, solar radiation is estimated using stored values of one or more of extraterrestrial radiation (RA), location information (e.g., latitude), time of year (e.g., day of year) and currently sensed temperature. In further embodiments, extraterrestrial radiation is not pre-stored in memory, but is calculated from other variables as described further below. As is generally known in the art, extraterrestrial radiation is value that is a function of the angle at which the sun strikes the earth at different times of the year at a specific geographic location or latitude, extraterrestrial radiation is not a measurement of the intensity of sunlight. Thus, in these embodiments, the memory 104 stores historical values for wind speed and humidity, and optionally extraterrestrial radiation. In any event, these historical values are preferably values corresponding to the geographic location of the irrigation control unit 100 and/or an irrigation controller coupled to the irrigation control unit 100. In some forms, multiple sets of historical values are stored in the memory 104, each set of historical values corresponding to a different geographic location. In one embodiment, for example, the user inputs an indication of a specific geographic location, for example, by inputting a zip code, a map code (e.g., a THOMAS GUIDE code), a latitude and/or a longitude, elevation, or other geographic or regional identifier. The processor 102 uses this input to select which set of stored historical values will be used in determining plant water requirements. In some embodiments, the historical values are pre-stored during manufacture and/or prior to sale of the irrigation control unit. In other embodiments, the historical values are entered by the user via the input 106, which is helpful in cases where historical values are not known for a given region that the irrigation control unit will be operated.

In one embodiment, plant water requirements are based on mathematical models of evapotranspiration (ET), such as the industry accepted Penman-Monteith model. The Penman-Monteith equation can be found in Crop Evapotranspiration: Guidelines for Computing Crop Water Requirements published by Food & Agriculture Organization of the United States (June 2000) and also located at http://www.fao.org on the internet, for example, see http://www.fao.org/docrep/X0490E/X0490E00.htm specifically and such as described in U.S. Publication Nos. 2004/0039489 and 2006/0161309 to Moore, all of which are hereby incorporated by reference in their entirety. It should be noted that as used herein, the term evapotranspiration at least refers to the actual evapotranspiration or the potential evapotranspiration determined from any of the methodologies now known or may become known in the future. This model utilizes weather data for temperature, solar radiation, humidity and wind speed to determine the amount of moisture lost by plant life due to evaporation and transpiration, i.e., ET, typically expressed in terms of inches of water. Typical systems include rain gauge sensors that measure an amount of rainfall, which can be used to offset a calculated ET value. According to several embodiments, on a periodic basis (e.g., every day), the irrigation control unit 100 uses stored (in the memory 104) historical average values of solar radiation (or alternatively, stored or calculated values of extraterrestrial radiation), humidity and wind speed together with currently sensed or measured temperature (from the temperature sensor 112) to calculate a reference ET value, often referred to as ETo. This reference ET value is then adjusted according to currently sensed rainfall measurements from the rainfall sensor 110 in order to determine a net or adjusted ET (generically, the plant water requirements) indicating how much water the irrigation control unit 100 should supply. In some embodiments, prior to adjusting for measured rainfall, the reference ET value is multiplied by a landscape coefficient to provide an ET value. Such landscape coefficients are well known values derived from the plant type, plant density and shade factor information that a user enters into the controller during setup. Accounting for landscape coefficients allows for some local adjustment to be factored into the ET calculation. Given the determined plant water requirements, the irrigation control unit 100 automatically determines whether or not irrigation should occur during the period of calculation of the plant water requirements. If it is determined that irrigation should occur, the irrigation control unit 100 automatically generates and implements a watering schedule or adjusts or interrupts an existing watering schedule to provide the amount of water needed by the plant life. As is recognized in the art, this watering approach is based on the needs of the plant life (i.e., it is a weather-based control system) as opposed to a time-based control system in which a watering schedule set by user (who is often an unsophisticated user, particularly with residential irrigation controllers). It is understood that other models may be used to determine plant water requirements, such as the Penman equation, the Blaney-Criddle equation, the Makkink equation, the Hargreaves equation or other equation that can calculate or approximate an ET value, such as described in U.S. Publication Nos. 2004/0039489 and 2006/0161309 to Moore, and U.S. Pat. No. 6,314,340 to Mecham, all of which are incorporated herein by reference. For the Hargreaves equation, see Hargreaves, George H., "Defining and Using Reference Evapotranspiration", Journal of Irrigation and Drainage Engineering, vol. 120, No. 6, pp. 1132-1139, November/December 1994, and such as described in U.S. Pat. No. 6,314,340 to Mecham, both of which are incorporated herein by reference. Furthermore, one or more of these models include sub-models to calculate or approximate one or more of the weather-based or environmental variables used in the model. For example, as described more fully below, a sub-model may approximate solar radiation from extraterrestrial radiation, geographic location (such as latitude), minimum and maximum temperature, time of year, etc. Thus, it is understood that in some embodiments, one or more of these sub-models are used at least in part to determine the plant water requirements.

In some embodiments, it can be difficult to obtain reliable values for solar radiation which are needed for determining plant water requirements based on conventional methods calculating ET. Many weather services no longer provide values for solar radiation as a measure of the intensity of radiation occurring on a given day. Additionally, current solar radiation tends to fluctuate from historical values of solar radiation due to varying cloud cover. Thus, in accordance with some embodiments, solar radiation is estimated from stored or calculated values of extraterrestrial radiation together with knowledge of the location (latitude) of the irrigation control unit 100, the time of year and the minimum and maximum temperatures (sensed by the temperature sensor 112) for the period of calculation of the plant water requirements (for example, one day). The estimation of solar radiation from these values is generally known and published, for example, in "FAO Irrigation and Drainage Paper 56" published by the Food and Agriculture Organization of the United Nations, 1998, ISBN 92-5-104219-5, which is incorporated herein by reference. This publication provides that to calculate or estimate solar radiation (Rs) from extraterrestrial radiation (Ra), the minimum temperature (Tmin) and the maximum temperature (Tmax), the following equation taken from page 60 of the FAO publication is used, by the processor 102:

$$Rs=0.175*SQRT(Tmax-Tmin)*Ra \qquad \text{Eq. (1)}$$

(SQRT is the square root operation)

The Ra value may be calculated by the processor 102 or may be pre-stored in the memory 104, such as in a lookup table of Ra values given the latitude and day of year. If the Ra is calculated by the processor 102, the following equation taken from page 46 of the FAO publication may be used:

$$Ra=37.59*d_r*[v_s*\sin(j)*\sin(d)+\cos(j)*\cos(d)*\sin(v_s)] \qquad \text{Eq. (2)}$$

Where:
$v_s$=arccos [−tan(j)*tan(d)]
$d_r$=1+0.033*cos(2p/365*J)
d=0.409*sin(2p/365*J−1.39)
j=latitude in radians
J=day of the year.

Latitude is retrieved from the memory 104. Latitude may be entered by the user into the irrigation control unit and stored in the memory. Alternatively, latitude may be determined from other location or regional variable/s (e.g., zip code, map code) entered by the user and stored in the memory 104. For example, the processor may utilize a lookup table to correspond the user input location variable to a latitude value. The day of year is automatically determined by the processor 102 since the irrigation control unit will have been initially programmed with the date and time.

It is recognized that by relying solely on pre-stored historical values of the variables (such as environmental variables) needed to determine the plant water requirements (i.e., no current data is sensed or provided), watering needs of plant life are often miscalculated since historical values of these variables are often averaged and not necessarily reflective of current weather conditions. On the other hand, it may be cost prohibitive to obtain current or sensed values of all of the variables needed to determine the plant water requirements. Some attempts have been made to approximate ET calculations using unproven models and/or sensing current values of temperature as an approximation of a current calculation of ET. Such techniques have been shown to be inaccurate. Furthermore, some weather or environmental variables may be relatively more consistent with historical values, while others are relatively less consistent with historical values. Further, the cost of obtaining current or sensed data for some weather variables is costly, in particular for residential applications. In an attempt to utilize industry accepted and proven models for calculating plant water requirements while at the same time striking a balance between accuracy in determining plant water requirements and the cost of obtaining sensed or current values of variables, several embodiments utilize proven and accepted models for determining plant water requirements using (1) stored historical values for those variables that are expensive or impractical to sense current values therefor and (2) using currently sensed and local values for other variables that it is inexpensive and practical to sense current values therefor. In several embodiments, the input 106 receives signals corresponding only to the current values temperature and current measured rainfall. Thus, in some embodiments, the irrigation control unit does not use any sensors for humidity, solar radiation or wind speed. Historical average values stored in the memory 104 specific to the region or location of the irrigation control unit are used for all other variables needed to determine the plant water requirements.

Thus, in some embodiments, processor 102 receives the current temperature measured by the temperature sensor 112 and the current amount of rain fall measured by the rainfall sensor 110, and also receives historical values for one or more values stored in the memory 104 needed for calculating plant water requirements. For example in one embodiment, the processor 102 receives stored historical measurements for humidity, wind speed and solar radiation from the memory 104. In embodiments that estimate solar radiation at least in part using extraterrestrial radiation, the processor 102 receives stored historical measurements for humidity, wind speed and extraterrestrial radiation from the memory 104. In one variation, extraterrestrial radiation is not stored in memory 104, but is estimated according to Eq. (2) above; thus, only historical values of humidity and wind speed are stored in the memory 104. In some embodiments, since current values for temperature and rainfall are sensed, the memory 104 does not store any historical values of temperature or rainfall that are used to automatically determine plant water requirements. Additionally, the memory 104 does not store historical plant water requirements, such as historical ET values. This is because the control unit 100 automatically calculates plant water requirements based on local conditions and allows local flexibility and/or adjustments in the determination of the plant water requirements. Using the above described particular combination of current and stored historical values, the plant water requirements are determined (e.g., calculated, estimated, etc.). In some embodiments, this provides an advantage in that watering schedules or adjustments to watering schedules are determined using the known and proven mathematical models but without requiring currently sensed values for all variables used in the calculation. Additionally, the devices used to provide the current values are typically less costly than corresponding devices needed for the variables that are stored. This combination of sensor device/s and stored variables eliminates the need to purchase an expensive full weather station capable of sensing current values or the need to receive periodic broadcasts of current values of these variables, which often requires a recurring subscription (e.g., paying for the paging of information to an irrigation controller). This particular combination may (but not always) result in a less than completely accurate calculation of the plant water requirements, but nevertheless results in the conservation of water. Further, this combination allows for a cost effective weather based irrigation control device to be produced for more widespread use than a control device that uses currently sensed values for all variables. As many governments have recognized the importance of water conservation and the need for irrigation systems not to overwater, it is important to produce inexpensive consumer and residential irrigation control devices that automatically irrigate based on local weather conditions and the needs of the plant life to be irrigated.

Depending on the embodiment, the determined plant water requirements may be used in a variety of ways. In some embodiments, the plant water requirement is used at least in part to automatically determine if irrigation should occur during the period of calculation (e.g., that particular day). In one embodiment, the decision of whether or not to irrigate is based on the concept of managed allowable depletion, such as described in more detail with reference to FIG. 4. Once it is determined that irrigation should occur or be allowed, in one embodiment, the plant water requirement is used at least in part to automatically create a watering schedule for one or more irrigation stations controlling the flow of water to an area to be irrigated. Typically, each irrigation station includes a flow control device, such as a valve or pump, that controls the flow of water therethrough to one or more sprinkler or watering devices. The watering schedule may be as simple as defining a start time for irrigation and a duration for irrigation for each station. The duration may be implemented over one or more cycles. In many embodiments, the plant water requirements will determine if irrigation is needed at a particular point in time, and if needed, then for how long irrigation is needed. Plant water requirements can be recalculated on a periodic basis as needed, for example hourly, daily, weekly, monthly, etc.

In another embodiment, the plant water requirement is again used at least in part to automatically determine if irrigation should occur during the period of calculation (e.g., that particular day). Then, the plant water requirement is used to adjust, modify or limit an existing watering schedule. For example, for each station, an existing watering schedule may be programmed to irrigate on defined watering days, at defined start times, and for defined durations. If the calculated plant water requirement indicates that watering is not needed on a particular watering day, the already programmed irrigation schedule will be interrupted on that day. If the calculated plant water requirement indicates that watering is needed on a particular watering day but for more or less than the predefined duration, the already programmed irrigation schedule will be adjusted or interrupted. For example, interruption of a programmed irrigation schedule can occur within the processor 102 (e.g., in the event the processor 102 is part of an irrigation controller) or can occur as a result of an interruption of the common line 222 return in a typical irrigation actuation line (e.g., in the event the processor 102 is part of a control device coupled to an irrigation controller). Several embodiments of the invention are used with time-based preprogrammed irrigation schedules, while several embodiments are used with weather-based and/or ET-based irrigation schedules.

Generally, while referring to historical and current values of variables used to determine plant water requirements, historical values refer to values corresponding to previous periods of time in terms of weather conditions whereas current values refer to values corresponding to a current period of time in terms of weather conditions. Depending on the embodiment and variability of weather conditions, historical values may be considered a value as early as one date prior to the current time.

The historical measurements may be stored according to day of the year, month of the year, season of the year, particular time of a particular day of the year, or other periodic reference point. For example, in some embodiments historical data is stored for each day of the year for a variety of locations, such as in each zip code in the United States.

The at least one input 106 is adapted to receive signals from the rainfall sensor 110 and the temperature sensor 112. In some embodiments, the rainfall sensor 110 and the temperature sensor 112 are integrated into a combination rainfall and temperature sensor 114. In several embodiments, the rainfall sensor 110 outputs a signal corresponding to the amount of current rain fall. Additionally, one or more of the rainfall sensor 110 and the temperature sensor 112 may be integrated into or internal to the irrigation control unit 100. In some embodiments, one or more of the rainfall sensor 110 and the temperature sensor 112 are external to the irrigation control unit 100 in a location proximate to or local in relation to the location of the irrigation control unit 100. In some embodiments, one or more of the sensors 110 and 112 may be located away from or remote in relationship to the location of the irrigation control unit 100. According to different embodiments, the at least one input 106 comprises one or more of a wireline input, a fiber-optic input or a wireless input in order to receive signals from sensors via wireline, fiber-optic connection, or wirelessly (e.g., using radio frequency or infrared signaling). In one form, the processor 102 receives the signals from the at least one input 106 and determines the number and type of sensor/s coupled to or integral with the irrigation control unit 100. In some embodiments, the connection between the at least one input 106 and the sensor 110 and 112 is a two wire connection providing AC power from the irrigation control unit 100 to the sensors 110/112. Thus, the at least one input 106 is a power and data interface. Bi-directional communication occurs over the two wires. For example, similar to multi-wire decoder based control systems, the irrigation control unit selectively power clips an AC sine waveform provided to the sensors 110/112 to communicate data to the sensors 110/112. To communicate data back to the irrigation control unit, the sensors 110/112 selectively short circuits the two-wire path to draw current during a portion of the waveform that is designated for feedback. This results in a voltage drop or a current draw which is sensed by the irrigation control unit. The shorting or non-shorting of the two-wire path during the designated portion is sensed by the input 106 and interpreted as logic 1 and 0, resulting in the communication of data from the sensors 110/112 to the irrigation control unit over the two wire interface. The two wire interface is designed without polarity so that the wires may be interchangeably connected and power and data can be delivered.

Additionally, in one embodiment, the input 106 is adapted to receive user input values that are used as the historical values stored in the memory 104 for future use or to receive user input values that are current values. User input current values may be used where the user determines or knows the current value of a variable and a sensor is not available. For example, the user input includes one or more of a keypad, a touchpad, a touch screen, a mouse, a dial, a switch, a button, a lever or other types of devices used to input information into the irrigation control unit.

Generally, the memory 104 is any type of storage medium capable of temporarily or permanently storing or buffering information, for example, a built-in hard disk drive, non-volatile flash memory, RAM, ROM, EEPROM, removable/insertable memory or any combination thereof. All or a portion of the memory 104 may be in the form of one or more removable blocks, modules or chips. The memory 104 need not be one physical memory device, but can include one or more separate memory devices. Furthermore, the memory 104 may be separate from or integrated with the processor 102. The functionality of the processor 102 and the memory 104 may be implemented as one of more of hardware, software or firmware.

The output 108 may be an output interface to cause irrigation, e.g., an interface for one or more actuation lines to couple to flow control devices (such as valves or pumps). In such case, the output 108 includes controllable switches and drivers to switch AC voltage signals or DC pulse voltage signals to a particular actuation line. DC pulse signals are commonly used with latching solenoids. In other embodiments, the output 108 is an encoder adapted to be coupled to a multi-wire path coupled to multiple decoder devices. In such case, the output 108 switches and modulates an AC or DC signal with data instructing one or more of the decoder devices to start or stop irrigation. In other embodiments, the output 108 is a control message output that outputs signaling to a wireline or wireless transmitter to send control signals to another device, e.g., an irrigation controller executing a watering schedule. In further embodiments, the output 108 is a controllable switch, e.g., that can electrically complete or break a return common line path for irrigation actuation lines of another irrigation controller.

Referring next to FIG. 2, a block diagram is shown of one embodiment of the irrigation control unit of FIG. 1. In this embodiment, an irrigation control unit 200 includes the processor 102, the memory 104 (which in this embodiment, are collectively as a microcontroller 202), a user interface 206 including a display 208 and user inputs 210, a sensor input interface 212 and an output interface 214, all generally contained within or integrated with a housing 204. Also illustrated rainfall sensor 110 and the temperature sensor 112, one or more actuation lines 218 each coupled to a flow control device 220 (e.g., a valve or pump) and a common line 222.

In this embodiment, the irrigation control unit 200 comprises a programmable irrigation controller including functionality in accordance with several embodiments for automatically determining plant water requirements and creating, adjusting or limiting watering schedules based on a combination of current and stored historical weather and environmental data. That is, in one embodiment, a user interacts with the user interface 206 to configure the irrigation control unit to allow it to automatically determine plant water requirements and generate watering schedules to be executed by the processor 102. In other embodiments, the user inputs, programs or creates one or more watering schedules or programs stored in the memory 104 and executed by the processor 102. In a typical irrigation controller, the processor 102 outputs signaling to the output interface 214 to cause actuation signals (e.g., AC voltage signals or DC pulse signals) to be applied to one or more of the actuation lines 218. When an actuation signal is applied to a given actuation line 218, the corresponding flow control device 220 is actuated (e.g., opened or closed) to allow or stop watering. For example, the output interface 214 includes drivers and switches that selectively switch a 24 volt AC power signal to one or more of the actuation lines 218. Additionally, the sensor input interface 212 provides a coupling point for one or more sensors 216, such as the sensors described above. Signaling received at the sensor input interface 212 is sent to the microcontroller 202 for storage and processing. In other embodiments, the output interface 214 may be an encoder output to a multi-wire path (e.g., a two-wire path) including multiple decoder devices.

The user interface 206 includes user inputs 210 and the display 208. The user inputs include, for example, one or more of a keypad, a touchpad, a touch screen, a mouse, a dial, a switch, a button, a lever or other types of devices used to input information into the irrigation control unit 200. The display 208 includes one or more of a display screen, indicator lights (e.g., LEDs), and audible indicators or other types of display devices. The user interface 206 is used to program and operate the irrigation control unit 200. According to some embodiments, during the initial setup or at a later time, the user inputs a variety of information, including, for example, location of the irrigation control unit 200, day of the year, soil type, gradient of the landscape, vegetation or plant type that is to be watered, start times, watering durations, water windows, non-watering days, or other factors or variables used in creating or adjusting watering schedules. In some forms, the location of the irrigation control unit 200 location is entered by inputting a zip code, a map code (e.g., a THOMAS GUIDE code) or elevation, longitudinal and/or latitudinal coordinate for the location to be irrigated. In several embodiments, the processor 102 uses this location information to select a given set of historical values stored in the memory 104. Using the date and/or time, the processor 102 determines what portion of the given set of historical values will be used in determining plant water requirements.

In some embodiments, the user interface 206 is used to enter historical data values for one or more of the variables used to determine the water plant requirements. This historical data may be used to replace or supplement any historical data already stored in the memory. In some embodiments where historical data is unknown for the region of operation during manufacture, the user interface allows the user to enter historical data specific to the region of operation. In some embodiments, no historical data values are pre-stored prior to sale because it is known beforehand that the irrigation control unit will be sold for use in a region with unknown historical data.

In several embodiments, the sensor input 212 receives signals from the rainfall sensor 110 and the temperature sensor 112 and forwards this information to the processor 102 and/or the memory 104. These signals correspond to current values for the amount of rainfall and temperature at the specific location of the irrigation control unit and/or the irrigation controller used to determine plant water requirements. In one or more embodiments, the signals received at the sensor input 212 are electrical signals representing the current temperature and the current amount of rainfall. For example, a signal having a certain voltage level corresponds to a given temperature or amount of rain fall. Additionally or alternatively, in some embodiments, the presence of a signal at the sensor input 212 corresponds to a given value. For example, the signal may be a pulse signal, each pulse corresponding to a certain incremental value of a variable. In other embodiments, the signals received at the sensor input 212 are data signals defining one or more values corresponding to the current temperature and/or current amount of rain fall. In each case, the signals received at the sensor input 212 correspond to a current value of a given variable.

The sensor input 212 is adapted to receive signals in a variety of ways, e.g., by wireline, fiber optic cable, and wireless communication. In some embodiments, the sensor input 212 is a power and data interface, delivering power (e.g., AC or DC power) to the sensors 110 and 112 and allowing bi-directional communications in a similar fashion as decoder based irrigation control systems as described above. One or both of the rainfall sensor 110 and the temperature sensor 112 are local sensors in that they are located at or proximate to the location to be watered. Alternatively, one or both of the sensors 110 and 112 are remote sensors in that they are located at a distance from the location to be watered. In some embodiments, the current values are broadcast by wireline and/or wirelessly and received at the sensor input 212. In some embodiments (not illustrated), sensors 110 and 112 are integrated into the housing 204 of the irrigation control unit 200. In an alternative embodiment, the current values are input by the user, for example, via the user interface 206. For example, the user may simply enter the current value for one or more variables. That is, in the appropriate menu option, the user enters the current values known to the user other than by using a sensor coupled to the irrigation control unit 200.

The processor 102 and the memory 104 are similar to that described in FIG. 1. The processor is generally coupled through one or more electrical connections (e.g., via a bus structure) to the user interface 206, the output interface 214 and the sensor input 212. The processor 102 is programmed to periodically automatically determine or calculate plant water requirements based on a plurality of variables. In many embodiments, the processor 102 receives current values for the temperature and the amount of rainfall. In one embodiment, the processor receives the temperature and rain measurements either directly from the sensor input 212 or from the memory 104. Further, the processor 102 receives pre-stored historical values for other variables, such as solar radiation, humidity and wind speed from the memory 104. The current values of the rainfall and temperature and the one or more historical values are then used to automatically calculate the plant water requirements. In one embodiment, the processor 102 uses the current value of temperature and historical values for the humidity, solar radiation and wind speed to calculate a reference ET value, ETo. In other embodiments, the processor 102 uses the current value of temperature and historical values for the humidity and wind speed along with stored values of extraterrestrial radiation to estimate solar radiation to calculate the ETo (for example, see Eq. (1) above). In embodiments where extraterrestrial radiation is not stored in memory 104, but is estimated (for example, see Eq. (2) above), only stored historical values for humidity and wind speed are used to calculate the ETo. In some embodiments, the reference ET value is multiplied by a landscape coefficient, $K_L$, to provide an adjusted ET value. The landscape coefficient is a well known value derived from the plant type, plant density and shade factor information that a user enters into the controller during setup. Next, the processor 102 uses the current value for the amount of rainfall to offset the adjusted ET value and therefore arrives at the plant water requirements. As a result, in some embodiments, the plant water requirements are determined at least using a combination of current values for of rainfall and temperature and stored historical values for one or more other variables needed according to the particular model to calculate the plant water requirements. Using the plant water requirements, the processor 102 automatically determines if watering should occur, and if so, automatically determines a watering schedule to provide the amount of irrigation to meet the plant water requirements. Advantageously, watering schedules or adjustments to watering schedules are determined using known and proven mathematical models for plant water requirements, but without requiring currently sensed values for all variables used in the calculation. In one embodiment, the plant water requirements are based on mathematical models of ET. Most industry accepted models, such as the Penman-Monteith model require values for temperature, solar radiation, humidity and wind speed. Additionally, the calculated values of ET are offset in some embodiments by measurements of rainfall or other local factors.

As described above, the plant water requirements are used in different ways by the processor 102 in different embodiments. For example, in one implementation, the irrigation control unit 200 is programmed with a watering schedule including, for example, watering days, start times, frequency of watering per watering day, and durations for one or more flow control devices 220. However, it is understood that a watering schedule may not require all of these variables to be programmed. For example, one or more of these variables may be set or not otherwise programmable. In one embodiment, a user inputs a start time and a watering duration to define a watering schedule for each station. This schedule is stored in the memory 104 and executed by the processor 102. However, the sensor input 212 receives currently sensed values for one or more variables. These variables are stored in the memory 104. On a periodic basis, the processor 102 automatically determines the actual plant water requirements, determines if irrigation should occur or be allowed and automatically makes adjustments to or overrides the programmed watering schedules. For example, the processor 102 determines the plant water requirements using current values for temperature and rainfall and stored historical values for one or more other variables, such as humidity, wind speed and solar radiation (or extraterrestrial radiation) such as described above. If it is determined that the plants to be watered require less water than would be provided by the programmed watering schedule, the processor 102 adjusts the watering schedule. For example, the processor 102 shortens watering durations or eliminates one or more watering events altogether. This adjustment or overriding can be performed in the execution of the schedule or may be performed by simply disallowing or disabling the output interface 214 from outputting control signals on the actuation lines 218. For example, the processor 102 may generate a signal that opens a switch that breaks the common line 222 that acts as a return line for the actuation lines 218. Once broken, the electrical path for the signaling on the actuation lines is interrupted and the watering schedule is overridden or interrupted. If it is determined that the plants to be watered require more water than would be provided by the programmed watering schedule, the processor 102 adjusts the watering schedule. For example, the processor 102 extends watering durations or adds one or more watering events.

In other embodiments, the user does not program a watering schedule as is normally understood. Instead, the user simply programs the processor 102 (via the user interface 206) to define certain watering days and start times, without defining watering durations or frequency of watering per day. Similarly, the user may instead program watering windows, i.e., periods of time on watering days during which irrigation is allowed. On a periodic basis (e.g., every day, every other day, every week, etc.), the processor 102 automatically determines plant water requirements based on the current values of rainfall amount and temperature and historical values of one or more other variables as described above. In several embodiments, the plant water requirements are expressed in terms of a unit of measurement water (e.g., inches or millimeters) that is lost by plant life and should be replenished through irrigation. Once the plant water requirements are determined, the processor 102 determines whether or not the plant life requires watering at all. If it is determined that watering is required, the processor 102 then determines what duration of watering (over one or more irrigation cycles) will provide the determined plant water requirement. For example, if the plant water requirements (e.g., a calculated ET value adjusted by any rainfall received since the last calculation) result in that 0.25 inches of water should be applied by the irrigation control unit 200, then the processor 102 determines (given flow control device 220 flow rate, water pressure, etc.) the duration of irrigation. The processor 102 then outputs signaling to the output interface 214 at the start time to cause irrigation for the specified duration. In this embodiment, the watering schedule is automatically calculated based on the plant water requirements, as opposed to adjusting or limiting a programmed watering schedule. In either case, these embodiments allow for the efficient use of water.

Figure 3:
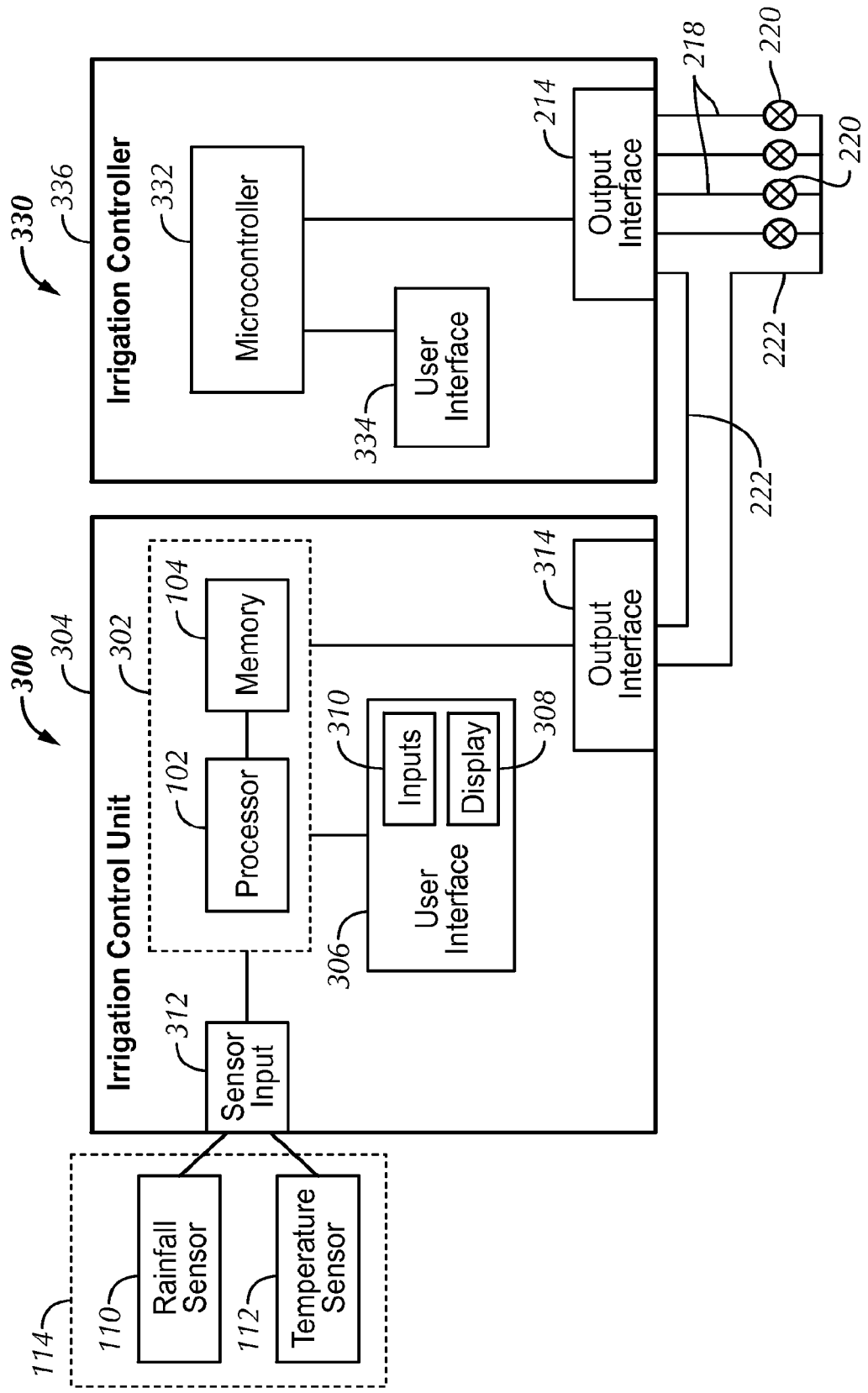
FIG. 3 is block diagram of another embodiment of the irrigation control unit of FIG. 1.

Referring next to FIG. 3, a block diagram is shown of another embodiment of the irrigation control unit of FIG. 1. In this embodiment, an irrigation control unit 300 is separate from (non-integrated with) a traditional programmable irrigation controller 330. The irrigation control unit 300 includes the processor 102, the memory 104 (which in this embodiment, are collectively as a microcontroller 302), a user interface 306 including a display 308 and user inputs 310, a sensor input 312 and an output interface 314, all generally contained within or integrated with a housing 304. The irrigation controller 330 includes a microcontroller 332, a user interface 334, and an output interface 214 all generally contained within or integrated with a housing 336. Also illustrated is the rainfall sensor 110 and temperature sensor 112 coupled to the sensor input 312, one or more actuation lines 218 each coupling the output interface 214 to a flow control device 220 (e.g., a valve or pump) and a common line 222.

In this embodiment, the irrigation control unit 300 is an add-on or accessory control device that is coupled to the traditional programmable irrigation controller 330. As is well known, the controller 330 irrigates based on programmed time-based watering schedules. For example, a user interacts with the user interface 334 to set or program one or more watering schedules stored in and executed by the microcontroller 332. In one example, for each flow control device 220 (often referred to as a zone or station), the microcontroller 332 is programmed to water on certain days and at certain times and for certain durations as set by the user. As described above, when the schedule indicates that watering should occur for a given flow control device 220, the output interface 214 switches an activation signal on a given actuation line 218 to the given flow control device 220 causing water to flow therethrough to one or more sprinkler devices.

According to several embodiments, the irrigation control unit 300 periodically and automatically adjusts, interrupts and/or overrides watering schedules implemented in the irrigation controller 330. Depending on the embodiment, the irrigation control unit 300 can automatically operate together with the irrigation controller 330 or operate completely independent of the irrigation controller 330 without its knowledge. In the illustrated embodiment, the irrigation control unit 300 is coupled to the irrigation controller 330 in that the common line 222 serially connects through the output interface 314 back to the output interface 214. In other words, the output interface 314 is in an electrical position on the common line 222 in between each flow control device 220 and the output interface 214. In other embodiments, the irrigation control unit 300 is directly coupled to the irrigation controller 330 at an input (not illustrated) of the irrigation controller 330. For example, the output interface 314 may be coupled by wireline or wirelessly to an interface (not shown) of the irrigation controller 330 which is coupled to the microcontroller 332. In these embodiments, the irrigation control unit 300 can communicate directly with the microcontroller 332. One advantage of the illustrated embodiment is that the irrigation control unit 300 can be coupled to any conventional programmable irrigation controller 330 independent of the functionality and make/model of the irrigation controller 330.

The user interacts with the user interface 306 to program the irrigation control unit 300. In preferred form, the irrigation control unit 300 should be programmed with the same or similar watering schedules as contained in irrigation controller 330. In one embodiment, the user inputs the same preprogrammed watering schedules that are stored in the irrigation controller 330 into the irrigation control unit 300. In another embodiment, the user inputs only the watering days and start times programmed into the irrigation controller 330. In further embodiments, the output interface 314 monitors the common line 222 over time and learns watering schedules programmed in the irrigation controller 330. For example, the output interface 314 is able to detect when an activation signal is applied to one of the activation lines 218 by sensing current flow on the common line 222. The user interface 306 may vary depending on different embodiments of the irrigation control unit 300. For example, the user interface 306 is similar to the user interface 206; however, not all embodiments require all components of the user interface 306.

Similar to the embodiments described above, the irrigation control unit 300 includes stored historical values of environmental variables in the memory 104 (e.g., either pre-stored during manufacture, prior to sale or entered by the user) used at least in part to determine plant water requirements. Additionally, the control unit 300 receives signals from the rainfall sensor 110 and the temperature sensor 112 at the sensor input 312 that correspond to current values including the amount of rainfall and temperature used at least in part to determine plant water requirements. Periodically, the processor 102 automatically determines the plant water requirements such as described above. In different embodiments, the processor 102 uses the determined plant water requirements in different ways. For example in one embodiment, if the processor 102 determines that watering is not needed on a particular watering day, then the processor 102 ensures that watering does not occur on that day. For example, the processor 102 sends a signal to the output interface 314 to prevent irrigation. In one form, the output interface 314 comprises a controlled switch that when opened, electrically breaks the common line 222, which eliminates an electrical path for any signaling on any of the actuation lines 218. In another form, the output interface 314 sends a signal to the microcontroller 332 (via an input, not shown) instructing it to not irrigate on that particular day. In the event the microcontroller 302 determines that watering is needed but for a shorter duration than programmed, the processor 102 sends a signal to the output interface 314 at a specified time after irrigation has begun but before irrigation should be concluded. The output interface 314 then electrically breaks the common line 222 to interrupt irrigation. Alternatively, the processor 102 sends a signal to the microcontroller 332 via the output interface 314 instructing it to irrigate for a shortened duration. In some embodiments, the programmed watering duration is set for the peak watering duration that would be needed (e.g., set for peak summer watering needs); thus, there is no need to irrigate for a longer duration than preprogrammed. These embodiments are preferred when the output interface 314 is coupled to and acts as a switch to interrupt the common line 222. In other embodiments, in the event the microcontroller 302 determines that watering is needed during a particular period, but for a longer duration than preprogrammed, the processor 102 sends a signal via the output interface 314 to the microcontroller 332 (direct connection not illustrated) to instruct it to temporarily increase the program duration.

Figure 4:
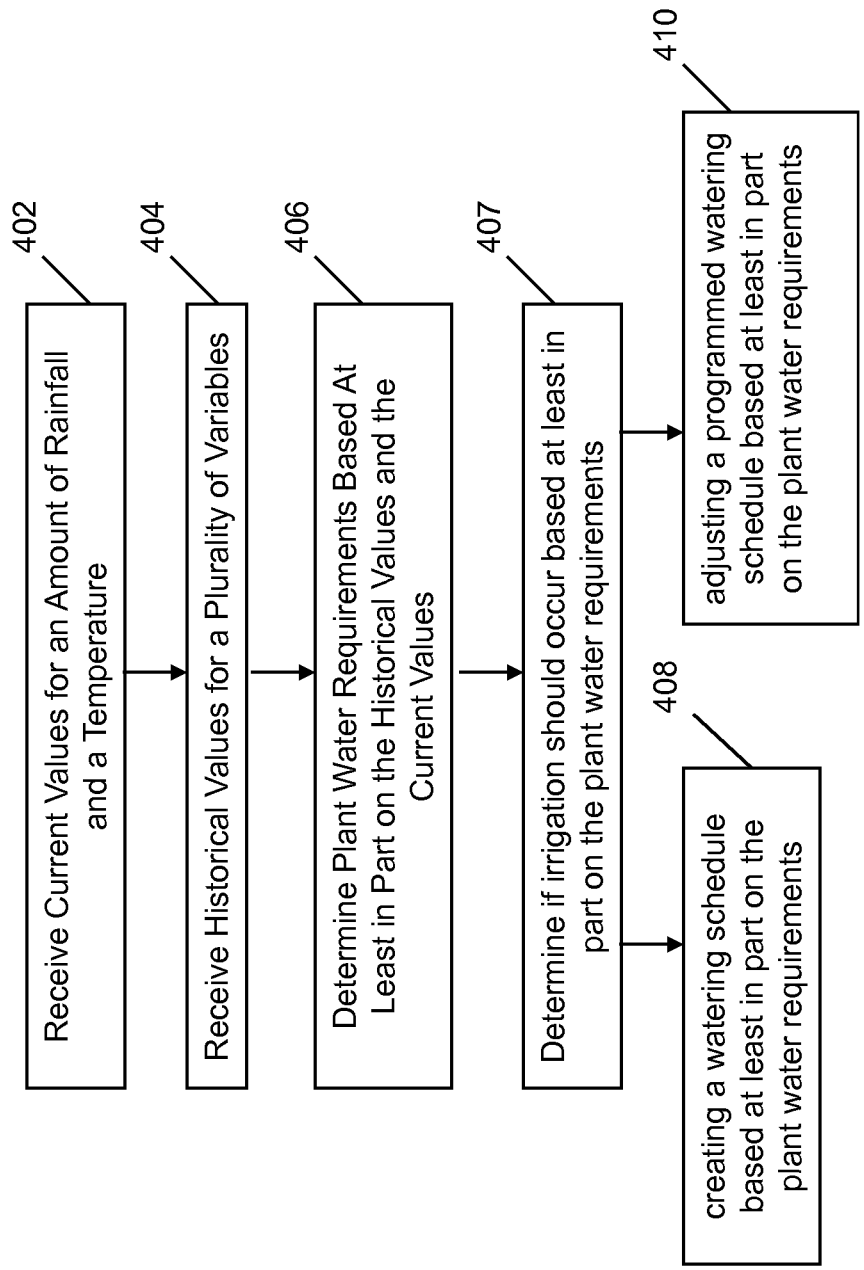
FIG. 4 is a flow chart illustrating a method of determining plant water requirements in accordance with several embodiments.

Referring next to FIG. 4, a flow chart is shown that illustrates a method of automatically determining plant water requirements in accordance with several embodiments. These steps may be performed, for example, by the irrigation control units described herein, such as irrigation control units 100, 200 and 300. Generally, in order to make efficient use of water in an irrigation system in accordance with several embodiments, periodically, plant water requirements are automatically determined based at least in part on a number of weather-based or environmental variables which are used to create and/or modify watering schedules. The plant water requirements are typically based on a mathematical model of the watering needs of plant life based on a number of variables including one or more of, but not limited to, temperature, solar radiation, extraterrestrial radiation, humidity, wind speed, rainfall and soil moisture content. In preferred form, the plant water requirements are based on models for the evapotranspiration (ET), such as provided by the Penman-Monteith model, as described above. Other known models or approximations may be used. Sensors are provided to output currently sensed values of rainfall and temperature used to determine plant water requirements. Additionally, historical values for one to more of these variables are pre-stored into a memory of irrigation control unit. The pre-stored values may be average or mean historical values for a given period of time, such as day, week, month, season, etc. In some embodiments, the pre-stored historical data values are stored in the irrigation control unit during manufacturing or otherwise prior to sale. In other embodiments, the pre-stored historical data is stored or loaded into the irrigation control unit at installation, for example downloaded or transferred from an external memory device into the memory of the irrigation control unit (e.g., via a computer or other input connection of the user interface). In other embodiments, the stored historical data is entered by the user, for example via the user interface. Such embodiments would allow the user to enter historical data for locations for which historical data is unavailable during manufacture or installation. In some embodiments, the historical data is pre-stored during manufacture, but can be replaced or supplemented with historical data entered by the user via the user interface.

Furthermore, other variables or configuration data may have already been entered by a user. The user inputs may pertain to location, time of the year, soil type, gradient of the landscape, vegetation type, or other factors that may affect water schedules. In preferred form, the location information includes a zip code, a map code, a longitudinal or latitudinal coordinate, and/or elevation information, to define the location that is being watered. In some embodiments, the user inputs the time of the year or some other periodic reference point so the controller can determine the current date (day, week, month), season or time of year. Additionally, in some embodiments, one or more of watering windows, start days, start times, are entered by the user. In some embodiments, the plant water requirements discussed below are adjusted by one or more local factors, such as some of the user entered variables.

Initially, current values of the amount of rainfall and temperature are received (Step 402). For example, these values are received at the processor 102 directly from the input 106 (from the rainfall sensor 110 and the temperature sensor 112) or from the memory 104 (in the event the current value/s from the input 106 are buffered in or temporarily stored in memory 104). It is noted that in several embodiments, historical values for one or more of temperature, rainfall and ET are not stored in the memory. Next, historical values for a plurality of variables needed to determine plant water requirements are received (Step 404). For example, these values are received at the processor 102 from the memory 104. For example, in several embodiments, the processor 102 retrieves historical values for one or more of humidity, solar radiation, extraterrestrial radiation and wind speed stored in memory 104 (e.g., pre-stored during manufacture or prior to sale or entered by the user). In some embodiments, only historical values are stored for humidity and wind speed. In other embodiments, only historical values are stored for humidity, wind speed and either solar radiation or extraterrestrial radiation are stored.

Next, plant water requirements are determined (e.g., calculated, estimated, etc.) at least in part using the current values of rainfall and temperature and the historical values for one or more other variables (Step 406). For example, in one embodiment, the processor 102 calculates the plant water requirements by first calculating a reference ET value (ETo) using the current value of temperature and the historical values from the set of variables. In preferred form, the processor automatically calculates ET according to the Penman-Montieth model using current values of temperature and historical values for wind speed, solar radiation and humidity. In other embodiments, the processor automatically calculates ET according to the Penman-Montieth model using current values of temperature and historical values for wind speed, extraterrestrial radiation and humidity. In such embodiments, solar radiation is estimated using the historical extraterrestrial radiation stored in the memory and corresponding to the geographic location of the irrigation control unit and the minimum and maximum currently sensed temperature for the period of time (such as for a given day) (for example, see Eq. (1)). In other embodiments, extraterrestrial radiation is estimated or calculated for use in calculating the solar radiation (for example, see Eq. (2)). In some embodiments, the reference ET value is multiplied by a landscape coefficient to provide an ET value. Next, in one embodiment, the landscape coefficient-adjusted ET value or the reference ET value is offset by the current amount of rain fall to arrive at the plant water requirements, e.g., an adjusted ET. As a result, in some embodiments, the plant water requirements are automatically determined at least using a combination of current values for rain fall and temperature and stored historical values for one or more other variables. In some embodiments, multiple sets of historical values are stored in memory, each corresponding to a different geographic location or region (e.g., defined by zip code, map code, latitude and/or longitude, elevation or other geographic identifier). The historical values corresponding to the specific geographic region are used to determine the plant water requirements. Furthermore, the historical values used (e.g., retrieved from memory) are stored values that correspond to the current date, season or time of year. In one example, if the current date is February 1, then the historical values that correspond to February 1 are used, e.g., either historical average values from previous years on this date, during the week of February 1, during the month of February, etc.

As discussed above, a variety of models may be used to determine the plant water requirements. Additionally, other factors or adjustments not prestored in memory and not provided by sensors may be used at least in part to determine the plant water requirements. For example, user input variables such as crop characteristics, soil characteristics, slope, etc. may be used depending on the particular model used by the irrigation control unit or any local adjustments made. In one embodiment, plant water requirements are determined using the Penman-Monteith model that uses temperature, solar radiation, humidity and wind speed to calculate an adjusted ET value which is then adjusted by an amount of rainfall received since the last determination. In some embodiments, solar radiation is estimated using temperature and extraterrestrial radiation. Furthermore, in some embodiments, extraterrestrial radiation is estimated or calculated.

Several embodiments may be used with a variety of models or equations to determine the plant water requirements. For example, several known models used to calculate evapotranspiration (one example of plant water requirements) include the Penman equation, the Penman-Monteith equation, the Blaney-Criddle equation, the Makkink equation and the Hargreaves equation. Furthermore, one or more of these models include sub-models to calculate or approximate one or more of the variables used in the model. For example, a sub-model may approximate solar radiation from minimum and maximum temperature, extraterrestrial radiation, location (such as latitude), time of year, etc. Thus, it is understood that in some embodiments, one or more of the historical values are estimated or approximated using one or more sub-modules and; therefore, one or more of these sub-models are used at least in part to determine the plant water requirements.

Next, it is determined if irrigation or watering should occur based at least in part on the plant water requirements (Step 407). In some embodiments, irrigation should occur if the plant water requirements exceed a specified threshold. In some embodiments, the decision of whether or not to irrigate is based on the concept of managed allowable depletion. For example, That is, if the plant water requirements exceed an allowable water depletion level for the plant life to be irrigated, then it is determined that irrigation should occur. If the plant water requirements do not exceed the allowable water depletion level for the plant life to be irrigated, then the plant water requirements are saved and accumulated with the calculated plant water requirements for the next calculation period (e.g., next day) and so on until the depletion level is exceeded. In other words, the plant water requirements determined in Step 406 may be an accumulated plant water requirement, i.e., the calculated plant water requirements for the given period of time (e.g., that day) plus the calculated plant water requirements from a previous period of time/s (e.g., previous day/s). Determining to irrigate based on managed allowable depletion is done in some embodiments in order to promote healthy plant growth. That is, the water content of plant life is allowed to deplete to a certain level before replenishing the depleted water content using irrigation in order to promote healthy growth.

Once it is determined that irrigation should occur (Step 407), the plant water requirements are used differently in different embodiments. According to several embodiments, a watering schedule is automatically created based at least in part on the plant water requirements (Step 408). For example, if the plant water requirements are determined to be 0.5 inches of water that should be applied to the plant life, then the duration of watering needed to supply 0.5 inches of water is determined. Then, at a given start time, watering is initiated for the calculated duration. It is understood that the duration may be continuous or may be broken up into separate periods of time or cycles (i.e., separate start times). The time between separate start times or cycles may be short or long depending on the needs of the system, and may account for the slope of the soil. If it is determined that irrigation is not needed (e.g., the plant water requirements are negative), then watering is not supplied.

In a typical implementation, a user has preprogrammed a start time and watering days or otherwise programmed a watering window. Periodically (e.g., once per day), the irrigation control unit automatically determines the plant water requirements and, for each watering day, determines if irrigation should occur. If irrigation should occur, the duration is calculated and watering is executed at the given start time for the duration.

Once the watering schedule is created, the schedule is either executed or transmitted to the device that executes the watering schedule. For example, at the determined start time, signals are generated by a processor to cause an activation signal to be applied to a given actuation line that will open/close a water flow control device (e.g., a latching or non-latching solenoid controlled valve or pump). The activation signal may be an AC voltage signal or DC pulse signal, for example. In some cases, the voltage signal is modulated by an encoder that outputs a signal to a multi-wire path having a plurality of decoder devices coupled thereto. Each decoder device is typically coupled to one or more water flow control devices.

According to several other embodiments, once the plant water requirements are determined (Step 406) and it is determined whether or not irrigation should occur (Step 407), a programmed watering schedule is adjusted based at least in part on the plant water requirements (Step 410). In these embodiments, a preprogrammed water schedule exists, for example, preprogrammed by a user into an irrigation control unit that determined the plant water requirements (see for example, FIG. 2) or preprogrammed into an irrigation controller coupled to an irrigation control unit determining the plant water requirements (see for example, FIG. 3). In some embodiments, when it is determined that irrigation should not occur, the schedule is completely interrupted or not allowed to irrigate. If it is determined that irrigation should occur, a watering duration is determined which when executed with provide the calculated plant water requirements (which may be an accumulated amount of multiple periods of calculation). The schedule is then adjusted by interrupting or overriding the scheduled watering at the appropriate time to provide the proper duration of irrigation. Alternatively, a control message is generated to shorten the preprogrammed watering duration. This occurs when the plant water requirements are less than would be provided by the watering schedule. In other embodiments, the schedule is adjusted when it is determined that more watering should occur than preprogrammed, for example, by extending the watering duration or adding additional watering events.

Once the watering schedule is adjusted, the adjusted schedule is either executed or transmitted to the device that executes the watering schedule such as described above. Alternatively, the schedule being executed by another irrigation controller is interrupted at the appropriate time to effect the adjustment. For example, referring to the irrigation control unit 300 of FIG. 3, the processor 102 determines when watering should be interrupted (or even allowed at all), and outputs a signal to the output interface 314 to open or electrically break the common line 222, stopping all irrigation at the flow control devices 220. Alternatively, a signal is transmitted to the irrigation controller 330 executing the water schedule to be adjusted, the signal instructing that the controller should adjust the programmed water schedule.

Figure 5:
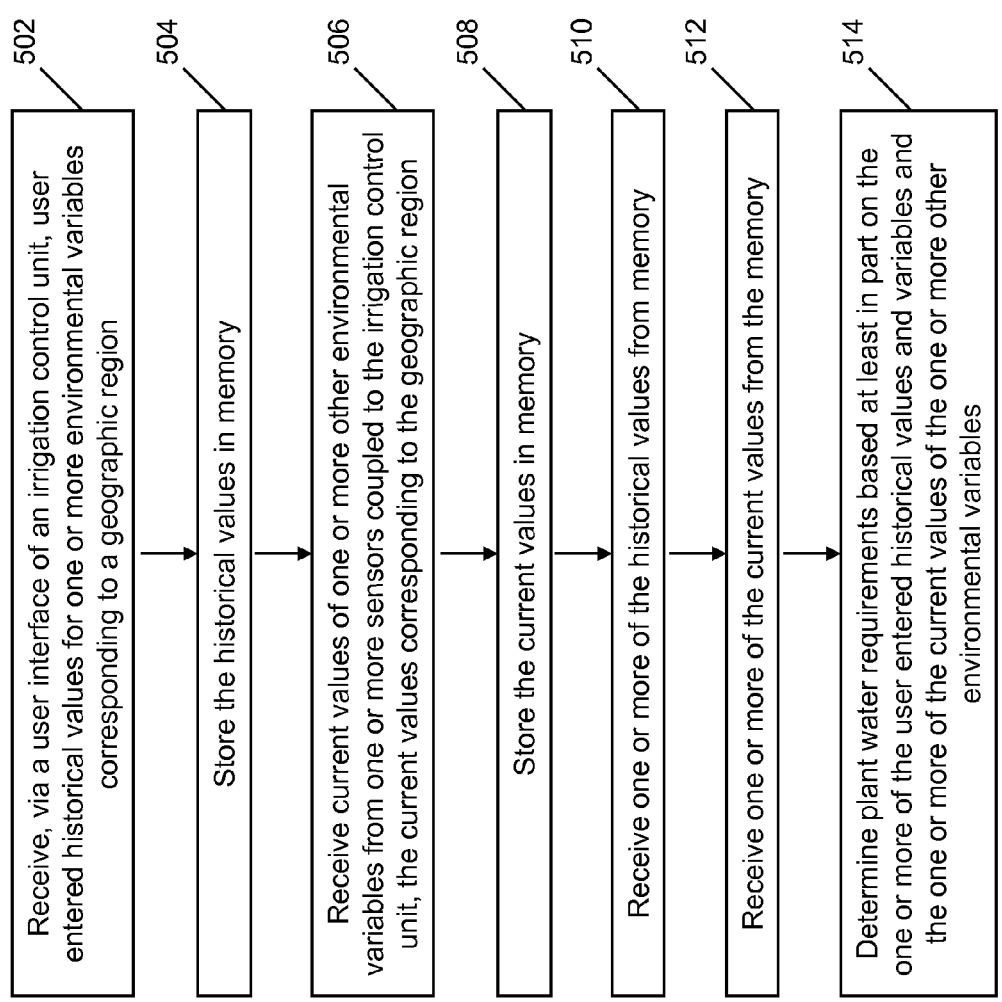
FIG. 5 is a flow chart illustrating a method of determining plant water requirements using one or more user entered historical values of one or more environmental variables together with one or more current values of one or more other environmental variables from one or more sensors in accordance with several embodiments.

Referring next to FIG. 5, a flow chart illustrates a method of determining plant water requirements using one or more user entered historical values of one or more environmental variables together with one or more current values of one or more other environmental variables from one or more sensors in accordance with several embodiments. For example, in some embodiments, for some geographic regions where an irrigation control unit may be operated, historical data for environmental variables used to determine plant water requirements is unknown. In other embodiments, the stored historical data for environmental variables specific to a particular geographic region may not necessarily be accurate for the particular location to be irrigated by the irrigation control unit. In such cases, and other cases, a user (e.g., an end user, a contractor or a programmer) is allowed to enter values for one or more variables that are stored in the irrigation control unit as historical values for the one or more environmental variables. In such embodiments, the user interface of the irrigation control unit, e.g., user interfaces 206 and 306, allow the user to enter such information. For example, the appropriate menu displays are generated based on user manipulation of one or more controls (such as rotary dials, buttons, etc.).

Accordingly, from the viewpoint of the irrigation control unit, user entered historical values for one or more environmental variables corresponding to a geographic region are received via a user interface of an irrigation control unit (Step 502). The historical values may be any data as determined by the user, whether the user obtains the data from a service or estimates the values based on measurements or approximations. In preferred embodiments, the one or more variables may include any of the variables described throughout this specification as being useful at least in part in determining plant water requirements, such as one or more of solar radiation, wind speed, and humidity. In some embodiments, since the irrigation control unit can sense temperature, user entered values are only received for one or both of humidity and wind speed. In such embodiments, the value for the environmental variable for solar radiation is estimated using currently sensed temperature together with pre-stored values of one or more of extraterrestrial radiation (RA), location information (e.g., latitude), and time of year (e.g., day of year) as described herein. Additionally, multiple historical values may be entered by the user for each of the environmental variables. For example, the user may enter a historical value for each of a period of time (e.g., a day, a week, a month, a season, etc.) for a given environmental variable. In operation, the irrigation control unit will use the user entered historical value that most closely corresponds to the date of use. In some embodiments, the user entered historical value/s are the primary source of values for the environmental variables, not a backup source. For example, the user entered historical values are not used as a backup in the event values from a remote or other source are not available. Advantageously, this embodiment does not rely on remote sources of values for variables and thus, the control unit can be simple and made cost effectively.

Next, the user entered historical values are stored in memory (Step 504), e.g., memory 104. The user entered values may be added to the memory in addition to other manufacturer pre-stored historical values that are stored in memory prior to the irrigation control unit being sold that correspond to other geographic regions. Alternatively, the user entered values may replace a set of manufacturer pre-stored historical values for the geographic region of the irrigation control unit. Thus, in some embodiments, the memory of the irrigation control unit contains pre-stored historical values for one or more of the environmental variables that will be used by the irrigation control unit. These pre-stored values are supplemented or replaced by the user entered values. In some cases, the memory contains pre-stored values for some of the environmental variables but does not pre-store historical values for others of the environmental variables. In some cases, the memory contains no pre-stored historical values for environmental variables. In other cases, the memory stores pre-stored (before the sale of the irrigation control unit) historical values of one or more environmental variables for each of multiple other geographic regions but does not store pre-stored historical values of one or more of the environmental variables for the geographic region to be irrigated.

Next, current values of one or more other environmental variables are received from one or more sensors coupled to the irrigation control unit, the current values corresponding to the geographic region (Step 506). The one or more other environment variables are different from the one or more environmental variables for which user entered historical values have been received. In preferred embodiments, the one or more other variables may include any of the variables described throughout this specification as being useful at least in part in determining plant water requirements. For example, in preferred embodiments, the one or more other environmental variables include temperature and an amount of rainfall. In this case, current values of a sensed temperature and a sensed amount of rainfall are received via an input of the irrigation control unit from a temperature sensor and a rainfall sensor or combination temperature and rainfall sensor. In some embodiments, the current value/s are the primary source of values for the one or more other environmental variables, not a backup source. For example, the current values are not used as a backup in the event current values from a remote or other source are not available.

Next, the current values are stored in memory (Step 508), e.g., memory 104, in addition to the user entered historical values and/or any other values pre-stored in memory prior to the irrigation control unit being sold.

Once the values are stored, in some embodiments, the irrigation control unit will begin automatic operation where it will use weather or environmental based data to automatically determine if irrigation is needed and if so, either generate an appropriate watering schedule or modify an existing watering schedule. Thus, in operation, one or more of the historical values are received (or retrieved) from memory (Step 510). For example, the irrigation control unit will only receive the historical value or values of the multiple stored values entered by the user that most closely corresponds to the current date of operation. For example, in one embodiment, the irrigation control unit receives a stored user entered historical value for each of humidity and wind speed that most closely corresponds to the current date of operation. In some embodiments, additional manufacturer pre-stored historical values may be retrieved from memory. Again, in preferred embodiments, the stored user entered historical values are the primary source, not a backup source of values for the one or more environmental variables.

Next, one or more of the current values of the one or more other environmental variables are received (Step 512). For example, in one embodiment, the current value for temperature and an amount of rainfall are received (or retrieved) from memory. For example, such values stored in memory are received from a temperature sensor 112 and a rainfall sensor 110 as described herein. In some embodiments, the values are received from a memory that is temporarily storing the current values as they are received from the appropriate sensors. Such stored sensor values are considered current sensed values since they have been obtained a local sensor. Again, in preferred embodiments, the stored current values are the primary source, not a backup source of current values for the one or more other environmental variables.

Next, plant water requirements are determined based at least in part on the one or more of the user entered historical values and the one or more of the current values of the one or more other environmental variables (Step 514), if current values are to be used. This determination may be made according to any of the methods described herein. For example, in some embodiments, plant water requirements are determined at least in part by determining an evapotranspiration (ET) value based at least in part on the one or more of the user entered historical values of the one or more environmental variables and the current value of the temperature and making an adjustment according to the current value of the rainfall. In one embodiment, the user entered historical values for humidity and wind speed corresponding to the current date are used with the current temperature and an estimation of solar radiation (based on the current temperature) to determine an ET value using known techniques, (such as the Penman-Monteith model), which is then adjusted at least by the current value of the rainfall. Once the plant water requirements are determined, the irrigation control unit can determine if watering is required and if so, create and implement a watering schedule or modify and run an existing watering schedule, such as described herein. In some embodiments, the user entered historical value/s and the current values are the primary sources of values for the environmental variables, not backup sources. For example, these values are not used as a backup in the event values from a remote or other source are not available.

Generally, it is noted that the method of FIG. 5 may be implemented by one or more components of an irrigation control unit. For example, under control and direction of a processor (e.g., processor 102), the method of FIG. 5 is performed. Additional components are provided, such as a user interface, memory and sensor input. For a user's perspective, in some embodiments, the user obtains or is provided with an irrigation control unit that is configured and manufactured to determine plant water requirements based at least in part on values of a plurality of environmental variables.

The irrigation control unit is also configured and manufactured to receive current values of a first set of one or more of the plurality of environmental variables, the current values corresponding to a geographic region. The user determines a historical value of each of a second set of one or more of the plurality of environmental variables, the historical values corresponding to a geographic region, where the first set of the one or more of the plurality of environmental variables are different environmental variables that the second set of the one or more of the plurality of environmental variables. The user then enters, via a user interface of the irrigation control unit, the historical values of each of the second set of the one or more of the plurality of environmental variables to be stored in an irrigation control unit for later use together with the current values of the first set of the one or more of the plurality of environmental variables by the irrigation control unit in determining the plant water requirements.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. An irrigation control unit comprising:
   at least one input configured to be coupled to and receive signals from a temperature sensor, the signals corresponding to current values of temperature taken from a current period of time in a year;
   a memory storing historical values of a plurality of variables, each stored historical value comprising an average of values obtained from one or more environmental sensors from previous years and representative of a historical value of the variable corresponding to a given period of time within a year; and
   a processor coupled to the at least one input and the memory, the processor configured to determine plant water requirements at least in part by calculating an evapotranspiration (ET) value using an equation comprising one or more of the historical values of the plurality of variables corresponding to the current period of time in the year and one or more of the current values of temperature.

2. The irrigation control unit of claim 1, wherein the plurality of variables comprises humidity and wind speed.

3. The irrigation control unit of claim 1, wherein the plurality of variables consists of humidity and wind speed.

4. The irrigation control unit of claim 1, wherein the plurality of variables comprises extraterrestrial radiation, humidity and wind speed.

5. The irrigation control unit of claim 1, wherein the plurality of variables consists of extraterrestrial radiation, humidity and wind speed.

6. The irrigation control unit of claim 1 wherein the processor is configured to estimate solar radiation based at least in part on a value of extraterrestrial radiation, the solar radiation used at least in part to calculate the ET value.

7. The irrigation control unit of claim 1, wherein the historical values of the plurality of variables are stored in the memory prior to the irrigation control unit being sold.

8. The irrigation control unit of claim 1, wherein the memory stores multiple sets of the historical values of the plurality of variables, each set of the historical values specific to a geographic region.

9. The irrigation control unit of claim 8, wherein based on a user input, the processor is configured to select one of the multiple sets of the historical values for use in determining the plant water requirements.

10. The irrigation control unit of claim 1 further comprising at least one output configured to be coupled to and control operation of irrigation flow control devices.

11. The irrigation control unit of claim 1 further comprising at least one output adapted to be coupled to an irrigation controller coupled to and controlling operation of irrigation flow control devices.

12. The irrigation control unit of claim 1 further comprising:
   the temperature sensor coupled to the at least one input.

13. The irrigation control unit of claim 12 wherein the temperature sensor comprise a combination rainfall and temperature sensor.

14. The irrigation control unit of claim 1, wherein the processor is configured to determine, based at least in part on the plant water requirements, whether irrigation should occur.

15. The irrigation control unit of claim 1, wherein the processor is configured to determine, based at least in part on the plant water requirements, a watering schedule in order to meet the plant water requirements.

16. The irrigation control unit of claim 1, wherein the processor is configured to determine, based at least in part on the plant water requirements, an adjustment to a programmed watering schedule.

17. The irrigation control unit of claim 1, wherein the processor is configured to determine the plant water requirements using the evapotranspiration (ET) value and a current amount of rainfall received from a local rainfall sensor.

18. The irrigation control unit of claim 1 wherein the at least one input is configured to be coupled to and receive signals from a rainfall sensor, the signals corresponding to current amount of rainfall.

19. The irrigation control unit of claim 1 wherein the ET value is adjusted by a local landscape coefficient.

20. The irrigation control unit of claim 19 wherein the local landscape coefficient is based on one or more of a plant type, a plant density and a shade factor.

21. The irrigation control unit of claim 1 wherein the ET value is adjusted by a user entered local factor.

22. A method for use in irrigation control comprising:
receiving current values of temperature from a temperature sensor, the current values corresponding to temperature of a geographic location taken from a current period of time in a year;
receiving stored historical values of a plurality of variables from a memory, each stored historical value comprising an average of values obtained from one or more environmental sensors from previous years and representative of a historical value of the variable corresponding to a given period of time within a year and corresponding to the geographic region;
calculating an evapotranspiration (ET) using an equation comprising one or more of the historical values of the plurality of variables corresponding to the current period of time in the year and one or more of the current values of temperature; and
determining plant water requirements based at least in part on the ET value.

23. The method of claim 22, wherein the plurality of variables comprises humidity and wind speed.

24. The method of claim 22, wherein the plurality of variables consist of humidity and wind speed.

25. The method of claim 22, wherein the plurality of variables comprises extraterrestrial radiation, humidity and wind speed.

26. The method of claim 22, wherein the plurality of variables consists of extraterrestrial radiation, humidity and wind speed.

27. The method of claim 22 further comprising:
estimating solar radiation based at least in part on a value of extraterrestrial radiation, the solar radiation used at least in part in the calculating the ET value step.

28. The method of claim 22 further comprising:
receiving a user input indicating the geographic region from a plurality of geographic regions; and
selecting the stored historical values of the plurality of variables from multiple sets of the historical values of the plurality of variables stored in the memory based on the user input, each set of the historical values specific to a particular geographic region.

29. The method of claim 22 further comprising determining, based at least in part on the plant water requirements, whether irrigation should occur.

30. The method of claim 22 further comprising determining, based at least in part on the plant water requirements, a watering schedule in order to meet the plant water requirements.

31. The method of claim 22 further comprising determining, based at least in part on the plant water requirements, an adjustment to a programmed watering schedule.

32. The method of claim 22 wherein the receiving the current value of temperature step comprises receiving the current value of temperature from a combination rainfall and temperature sensor.

33. The method of claim 22 wherein the determining the plant water requirements step comprises determining the plant water requirements using the ET value and a current amount of rainfall received from a local rainfall sensor.

34. The method of claim 22 further comprising receiving a current amount of rainfall from a rainfall sensor.

35. The method of claim 22 further comprises adjusting, prior to determining the plant watering requirements, the ET value a local landscape coefficient.

36. The method of claim 35 wherein the local landscape coefficient is based on one or more of a plant type, a plant density and a shade factor.

* * * * *